(12) United States Patent
Bockwoldt et al.

(10) Patent No.: US 8,248,926 B2
(45) Date of Patent: Aug. 21, 2012

(54) PACKET RATE DETECTION APPARATUS AND METHOD

(75) Inventors: Bruce Bockwoldt, Chatsworth, CA (US); John Dalmau, Simi Valley, CA (US); Gerald Pepper, Thousand Oaks, CA (US); Noah Gintis, Westlake Village, CA (US); Bryan Rittmeyer, Sherman Oaks, CA (US)

(73) Assignee: Ixia, Calabasas, CA (US)

( * ) Notice: Subject to any disclaimer, the term of this patent is extended or adjusted under 35 U.S.C. 154(b) by 329 days.

(21) Appl. No.: 12/777,389

(22) Filed: May 11, 2010

(65) Prior Publication Data
US 2011/0280137 A1    Nov. 17, 2011

(51) Int. Cl.
*G01R 31/08* (2006.01)
(52) U.S. Cl. ........................................ 370/229
(58) Field of Classification Search .................. 370/229, 370/230, 232, 234, 241, 252, 253
See application file for complete search history.

(56) References Cited

U.S. PATENT DOCUMENTS

| | | | |
|---|---|---|---|
| 7,543,073 B2 | 6/2009 | Chou et al. | |
| 2011/0069626 A1* | 3/2011 | Sun et al. | 370/252 |
| 2011/0261698 A1* | 10/2011 | Kamerkar et al. | 370/235 |
| 2011/0261705 A1* | 10/2011 | Kamerkar et al. | 370/252 |

* cited by examiner

*Primary Examiner* — Fan Ng
(74) *Attorney, Agent, or Firm* — SoCal IP Law Group LLP; Steven C. Sereboff; John E. Gunther (57) ABSTRACT

There are disclosed an apparatus, a machine readable media, and methods for testing a network. The apparatus may include a statistics engine coupled to a memory. The statistics engine may extract a packet group identifier (PGID) from a packet received from the network and retrieve traffic statistics associated with the PGID from the memory. The retrieved traffic statistics may include a packets-per-interval count and a packets-per-interval threshold, the packets-per-interval count indicating a number of packets received within a time interval of a sequence of time intervals. At the start of each new time interval, the statistics engine may set a flag indicating whether or not the packets-per-interval count for the previous time interval was equal to or greater than the packets-per-interval threshold. The flag may be saved in the memory as part of the traffic statistics associated with the extracted PGID.

24 Claims, 8 Drawing Sheets

PACKET RATE DETECTION APPARATUS AND METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating and receiving traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols.

In order to test a packet switched network or a device included in a packet switched communications network, test traffic comprising a large number of packets may be generated, transmitted into the network at one or more ports, and received at different ports. Each packet in the test traffic may be a unicast packet intended for reception at a specific destination port or a multicast packet, which may be intended for reception at two or more destination ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be both a source of test traffic and a destination for test traffic. Each port unit may emulate a plurality of logical source and/or destination addresses. The number of port units and the communications paths that connect the port units to the network are typically fixed for the duration of a test session. The internal structure of the network may change during a test session, for example due to failure of a communications path or hardware device.

A series of packets originating from a single port unit and having a specific type of packet and a specific rate will be referred to herein as a "stream." A source port unit may support multiple outgoing streams simultaneously and concurrently, for example to accommodate multiple packet types, rates, or destinations. "Simultaneously" means "at exactly the same time." "Concurrently" means "within the same time."

A plurality of concurrent streams may be combined to form the test traffic output from a source port. The streams within the test traffic may be transmitted sequentially or concurrently through interleaving. The interleaving may be balanced, unbalanced, and distributed among the represented streams. To test a modern "triple play" network and network equipment, the test traffic may contain simulated data, audio, and video streams.

The test traffic may be divided into a plurality of "traffic items", where each traffic item is effectively a separate test from each other traffic item. Test traffic for some or all of a plurality of traffic items may be generated and transmitted concurrently. Each traffic items may include a plurality of streams, and each stream may typically be a portion of a single traffic item.

For the purpose of collecting test data, the test traffic for each traffic item may be organized into packet groups, where a "packet group" is any plurality of packets for which network traffic statistics are accumulated. The packets in a given packet group may be distinguished by a packet group identifier (PGID) contained in each packet. The PGID may be, for example, a dedicated identifier field or combination of two or more fields within each packet.

For the purpose of reporting network traffic data, the test traffic for each traffic item may be organized into flows, where a "flow" is any plurality of packets for which network traffic statistics are reported. Each flow may consist of a single packet group or a small plurality of packet groups. Each packet group may typically belong to a single flow.

Within this description, the term "engine" means a collection of hardware, which may be augmented by firmware and/or software, which performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic device (PLD), or a programmable logic arrays (PLA). The gate netlist or other physical description may be converted into process instructions and masks for fabricating the engine within an application specific integrated circuit (ASIC).

Within this description, a hardware "unit" also means a collection of hardware, which may be augmented by firmware and/or software, which may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 114, or within a common FPGA, ASIC, or other circuit device.

In this description, the term "logic" is intended to encompass combinatorial logic circuits, sequential elements such as latches and registers, adaptive logic circuits and/or processors controlled by firmware, and other digital circuits that perform a specified function. An engine may include a plurality of logic elements.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

In block diagrams, arrow-terminated lines may indicate data paths rather than signals. Each data path may be multiple bits in width. For example, each data path may consist of 4, 8, 16, 32, 64, or more parallel connections.

DETAILED DESCRIPTION

Figure 1:
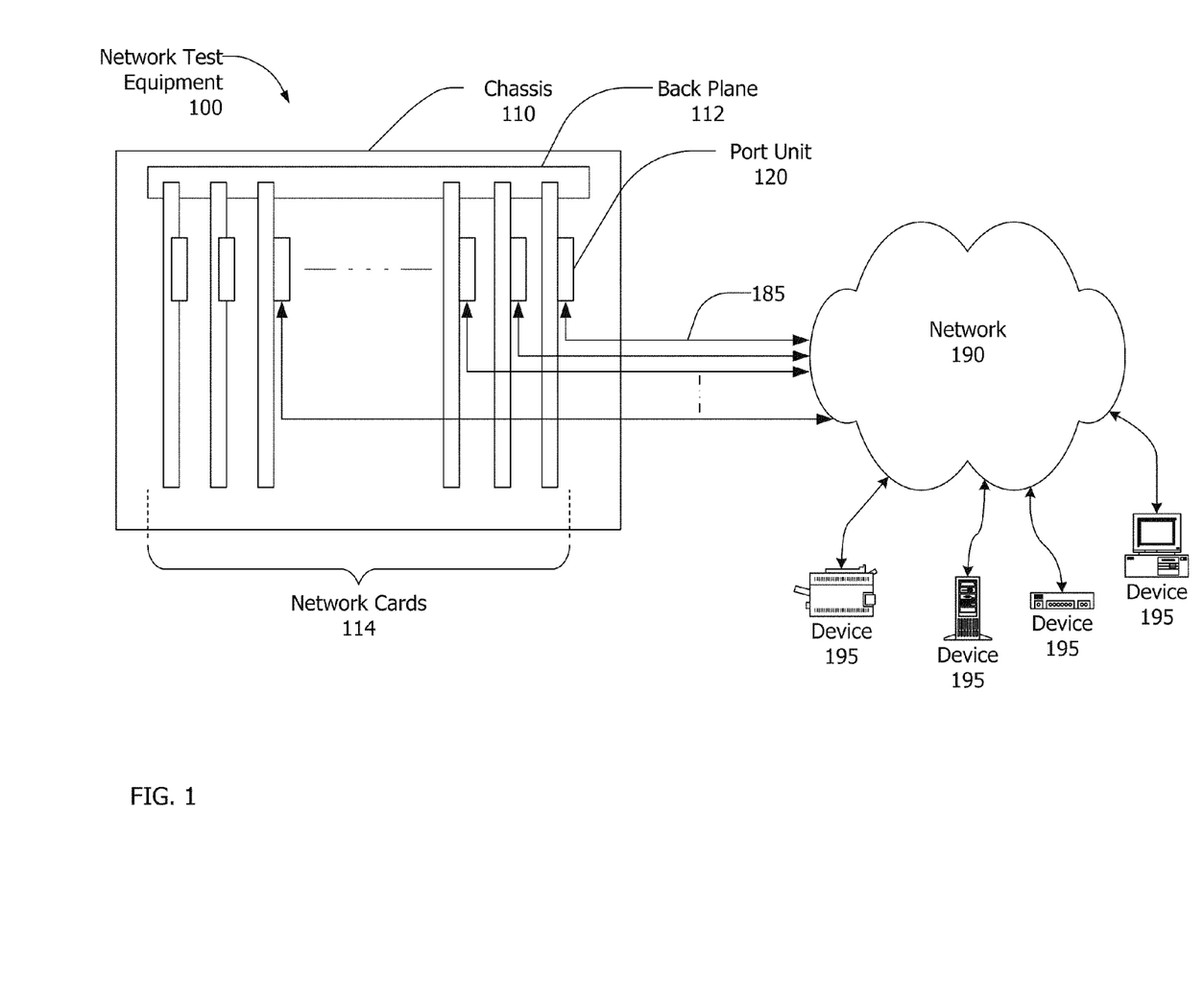
FIG. 1 is a block diagram of a network environment.

FIG. 1 shows a block diagram of a network environment. The environment may include network test equipment 100, a network 190 and plural network devices 195.

The network test equipment 100 may be a network testing device, performance analyzer, conformance validation system, network analyzer, or network management system. The network test equipment 100 may include one or more network cards 114 and a backplane 112 contained or enclosed within a chassis 110. The chassis 110 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 114 may support one or more well known standards or protocols such as the various Ethernet and Fibre Channel standards, and may support proprietary protocols as well.

The network cards 114 may include one or more field programmable gate arrays (FPGAs), application specific integrated circuits (ASICs), programmable logic devices (PLDs), programmable logic arrays (PLAs), processors and other kinds of devices. In addition, the network cards 114 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 114 may support a single communications protocol, may support a number of related protocols, or may support a number of unrelated protocols. The network cards 114 may be permanently installed in the network test equipment 100 or may be removable.

Each network card 114 may contain one or more port unit 120. One port unit or a plurality of port units may connect to the network 190 through respective ports. Each port may be connected to the network through a respective communication medium 185, which may be a wire, an optical fiber, a wireless link, or other communication medium. The communications media connecting the network to a plurality of ports may be the same or different. Each port unit 120 may generate and transmit test traffic to the network, and each port unit 120 may receive test traffic from the network. Packets transmitted by one of the port units 120 may commonly be received by one or more other port units.

The backplane 112 may serve as a bus or communications medium for the network cards 114. The backplane 112 may also provide power to the network cards 114.

The network devices 195 may be any devices capable of communicating over the network 190. The network devices 195 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 195 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 195 may communicate simultaneously with one another, and there may be plural logical communications paths between the network test equipment 100 and a given network device 195. The network itself may be comprised of numerous nodes providing numerous physical and logical paths for data to travel.

Figure 2:
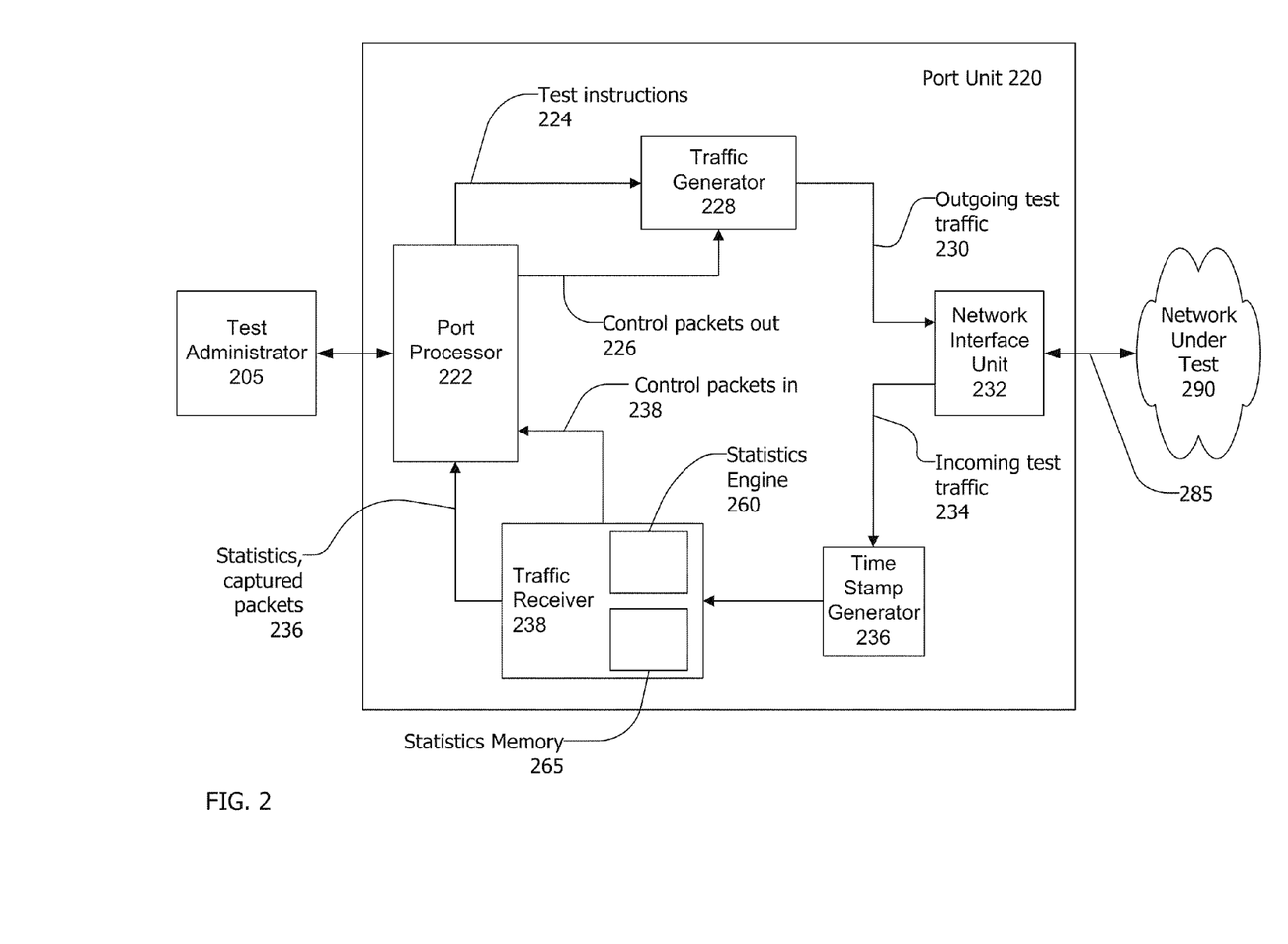
FIG. 2 is a block diagram of a port unit.

Referring now to FIG. 2, an exemplary port unit 220 may include a port processor 222, a traffic generator 228, a traffic receiver 238, and a network interface unit 232 which couples the port unit 220 to a network under test 290. The port unit 220 may be all or part of a network card such as the network cards 114.

The port processor 222 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port processor 222 may communicate with a test administrator 205. The test administrator 205 may be a computing device contained within, or external to, the network test equipment 100. The test administrator 205 may provide the port processor with instructions and data required for the port unit to participate in testing the network 290. The instructions and data received from the test administrator 205 may include, for example, definitions of packet streams to be generated by the port unit 220 and definitions of performance statistics that may be accumulated and reported by the port unit 220.

The port processor 222 may provide the traffic generator 228 with test instructions 224. The test instructions 224 may cause the traffic generator 228 to form a plurality of streams that may be interleaved to form outgoing test traffic 230. Each of the streams may include a sequence of packets. The test instructions 224 may include, for example, the type of packet, the frequency of transmission, definitions of fixed and variable-content fields within the packet and other information for each packet stream.

The network interface unit 232 may convert the outgoing test traffic 230 from the traffic generator 228 into the electrical, optical, or wireless signal format required to transmit the test traffic to the network under test 290 via a link 285, which may be a wire, an optical fiber, a wireless link, or other communications link. Similarly, the network interface unit 232 may receive electrical, optical, or wireless signals from the network over the link 285 and may convert the received signals into incoming test traffic 234 in a format usable to the traffic receiver 238.

A timestamp generator 236 may generate and append or logically associate a receive timestamp to each received packet. The timestamp may be an absolute time or a relative time expressed, for example, as a number of intervals of an internal clock. For example, a master time counter may be set to zero at the beginning of a test session or some other time and may increment upward continuously on each cycle of the clock. The timestamp associated with each packet may be the total clock cycle count at the instant the packet was received.

The traffic receiver 238 may receive the incoming test traffic 234 from the network interface unit 232. The traffic receiver 238 may include a statistics engine 260 to accumulate test statistics based on the received packets. The statistics engine 260 may, for example, accumulate quantitative data such as the number of received packets, the number of defective packets received and/or the number of out-of-sequence packets received. The statistics engine 260 may, for further example, accumulate temporal data for the received packets such as a shortest latency time and/or a longest latency time. The statistics engine 260 may accumulate other statistics on received packets. The statistics engine 260 may separately accumulate test statistics for each packet group of a large plurality of packet groups received by the port unit. The statistics engine 260 may be coupled to a statistics memory 265 to store the accumulated test statistics for each of the plurality of packet groups.

The traffic receiver 238 may also capture and store specific packets in accordance with capture criteria provided by the port processor 222. The traffic receiver 238 may provide test statistics and/or captured packets 236 to the port processor 222, for additional analysis during, or subsequent to, the test session.

The outgoing test traffic 230 and the incoming test traffic 234 may be primarily stateless, which is to say that the outgoing test traffic 230 may be generated without expectation of any response and the incoming test traffic 234 may be received without any intention of responding. However, some amount of stateful, or interactive, communications may be required or desired between the port unit 220 and the network 290 during a test session. For example, the traffic receiver 238 may receive control packets, which are packets containing data necessary to control the test session, that require the port unit to send an acknowledgement or response. Control packets may include, for example, packets conforming to various routing protocols necessary to define the port unit 220 to the network under test 290.

The traffic receiver 238 may separate incoming control packets from the incoming test traffic and may route the incoming control packets 234 to the port processor 222. The port processor 222 may extract the content of each control packet and may generate an appropriate response in the form of one or more outgoing control packets 226. Outgoing control packets 226 may be provided to the traffic generator 228. The traffic generator 228 may insert the outgoing control packets into the outgoing test traffic 230.

One traffic statistic that may be desired is a rate or average time interval at which packets in each packet group are received. However, the time interval between successive packets in the same packet group may be inconsistent, or jitter, such that the elapsed time between two successive packets may not be an accurate measure of average reception rate. A better measure of packet rate would be to calculate a moving average over a larger number of successive received packets. For example the elapsed time required to receive a predetermined number of successive packets in a packet group, when divided by the number of packets, would provide a better measure of packet reception rate. However, the amount of memory required to save the timestamps for the predetermined number of successive packets may be impractical, considering that the statistics engine 260 may be accumulating traffic statistics for 100,000 or more packet groups.

As an alternative to calculating a moving average of the time interval between successive packets in each packet group, the statistics engine 260 may, for each packet group, maintain a count of the number of packets received within successive time intervals. At the start of each new time interval, the statistics engine may determine whether or not the number of packets received in the previous time interval was equal to or above a threshold amount, and may set a rate flag accordingly. A separate packet count and rate flag may be maintained for each packet group.

Since the anticipated reception rate and amount of jitter for each of the various packet groups may vary widely, the duration of the time intervals and the threshold amounts may be set individually for each packet group. When a relatively uniform reception rate is anticipated, the time interval may be set based on desired measurement accuracy. For example, in order to determine an arrival rate for a packet group to an accuracy of about 1%, the time interval duration should be selected such that more than 100 packets are anticipated to arrive in each interval. However, if the arrival rate only needs to be determined to an accuracy of 5%, the time interval duration may be set such that 20 or more packets are anticipated to arrive during each interval. When the packet reception rate is anticipated to be inconsistent or jittery, a relatively long time interval may be selected to avoid inaccurate rate measurements due to bursts of packets. For example, a given packet group may be expected to include bursts of packets separated by periods of few or no received packets. In this situation, inaccurate measurements may be avoided by setting the time interval long enough to capture several bursts and setting the threshold to a value substantially higher than the number of packets expected in a single burst.

The packet count, the rate flag, the time interval duration, and the threshold amount for each packet group may be stored in the statistics memory 265. Additional details of the logic within the statistics engine to determine packet rate will be provided within the discussion of FIGS. 5, 6 and 7.

Figure 3:
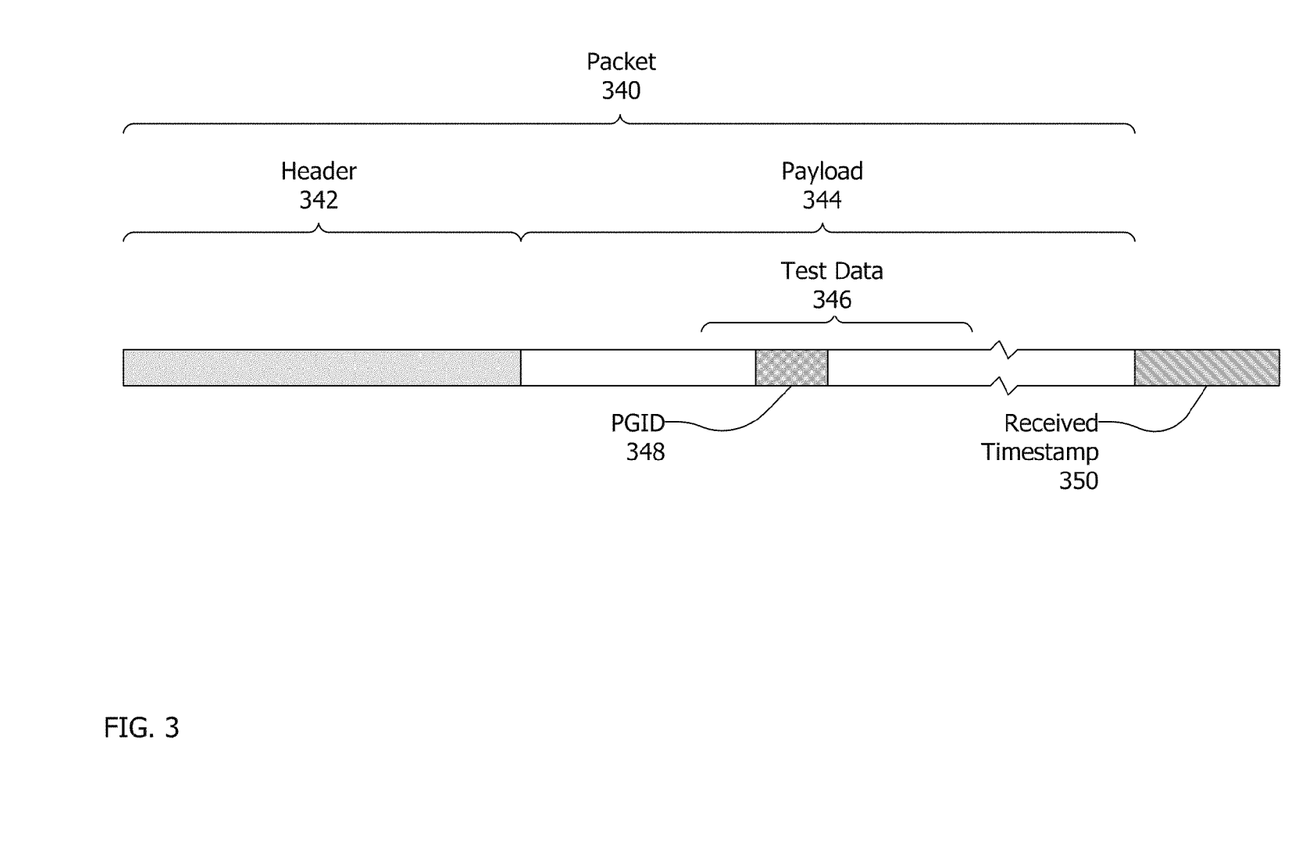
FIG. 3 is a graphical representation of a packet.

Referring now to FIG. 3, a representative packet 340 may include a header 342 and a payload 344. The header 342 may include a plurality of cascaded headers corresponding to sequential communications protocol layers. For example, the header 342 may include a layer two header, such as a Media Access Control header; a layer three header, such as an Internet Protocol header; and a layer four header, such as a Transmission Control Protocol or User Datagram Protocol header. In addition, the header 342 of the packet 340 may be changed during transmission through a network, for example by the addition or removal of Multiple Protocol Label Switching labels or tunneling protocol headers. Thus a substantial amount of processing may be required to parse and interpret the various fields within the header 342.

To allow a packet receiver to determine if a received packet is part of a test session, and to enable the packet receiver to extract test data from a received packet without parsing the header portion of the packet, the packet 340 may include one or more test data fields 346. The test data fields 346 may include a signature that allows the packet receiver to locate the test data fields and a packet group identifier (PGID) 348 that identifies each received packet as a member of a respective packet group. The test data fields 346 may also include, for example, a sequence number within the identified packet group, a transmitted timestamp, and other test information.

A received timestamp 350 may be appended or otherwise logically associated with each received packet. The timestamp 350 may be associated with the packet 340 by a timestamp generator such as the timestamp generator 236.

Figure 4:
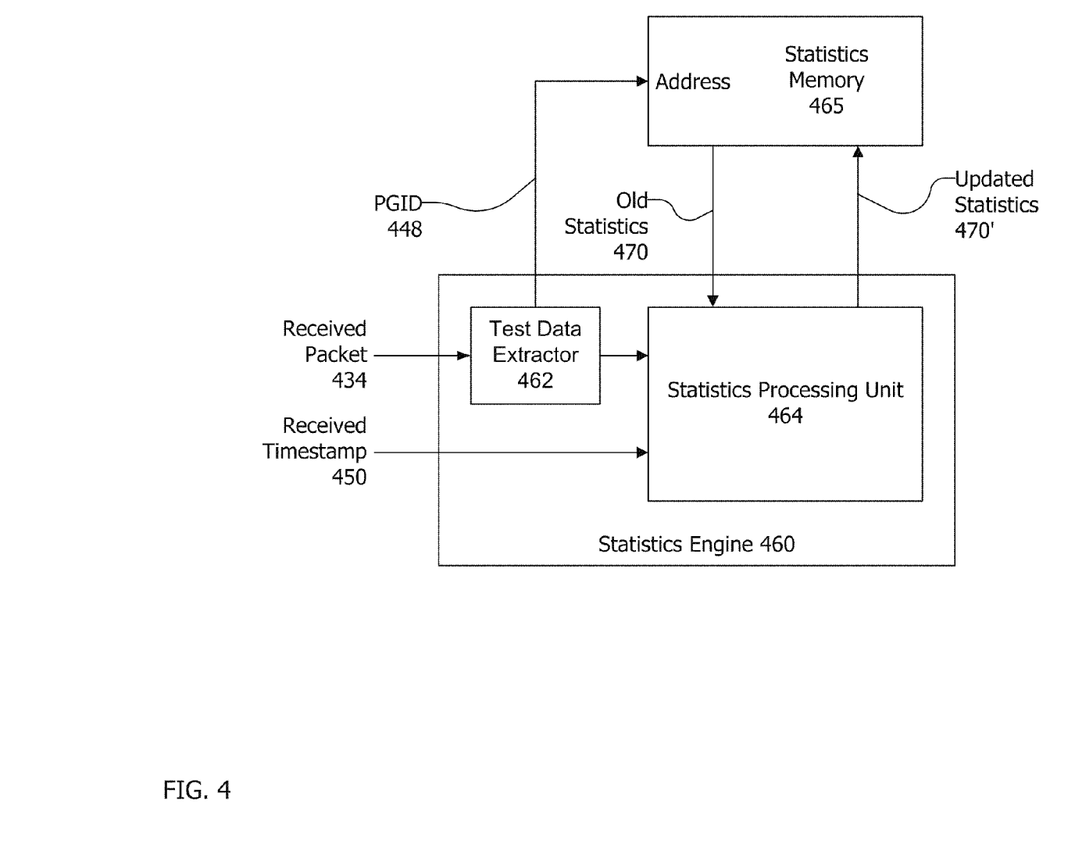
FIG. 4 is a block diagram of a statistics engine and statistics memory.

Referring now to FIG. 4, a traffic receiver, such as the traffic receiver 238, may include a statistics engine 460 and a statistics memory 465. The statistics engine may include a test data extractor 462 and a statistics processing unit 464.

The test data extractor 462 may contain logic to located and extract test data from a received packet 434. For example, the test data extractor may perform a floating pattern match between a predetermined signature and the received packet 434. When a signature field within the packet matching the predetermined signature is located, the test data extractor 462 may locate test data fields within the received packet 434 based on the relative position of the test data fields with respect to the signature field. The test data extractor 462 may then extract the test data fields from the received packet 434. The test data extractor 462 may locate and extract test data fields from the received packet 434 in some other manner.

One test data field extracted from the received packet 434 may be a PGID (packet group identifier) field 448 that identifies the received packet 434 as a member of a specific packet group. The PGID field 448 extracted from the received packet 434 may be used to read traffic statistics 470 associated with the specific packet group from the statistics memory 465. The PGID field 448 may be used directly as all or a portion of an address to read the statistics memory 465. The PGID field may be used to generate the address to read the statistics memory.

The statistics processing unit 464 may receive the traffic statistics 470 read from the statistics memory 465. The statistics processing unit 464 may update the read traffic statistics based on the test data extracted by the test data extractor 462 and based on the receive timestamp 450 associate with the received packet 434. For example, assuming that a field within the read traffic statistics 470 is a total number of packets received, the statistics processing unit 464 may increment the total number of packets received field to reflect that an additional packet 434 has been received. For further example, the read traffic statistics may include a field containing a sequence number of the previous received packet (for this packet group) and a field indicating the number of packets received out-of-sequence. In this case, the statistics processing unit 464 may compare a sequence number extracted from the received packet 434 with the previous sequence number read from the statistics memory 465 to determine if the received packet 434 is the next packet in the sequence. When the received packet 434 is not the next packet in sequence, the number of packets received out-of-sequence statistic may be incremented.

The statistics processing unit 464 may update these and numerous other traffic statistics each time a packet is received. Updating traffic statistics may include replacing data fields read from the statistics memory 465 with new information associated with the received packet 434. For example the receive timestamp 450 associated with received packet 434 may replace a previous packet timestamp included in the read traffic statistics 470. Similarly, the sequence number extracted from the received packet 434 may replace the previous sequence number included in the read traffic statistics 470. Updated statistics 470' may be stored in the statistic memory 465 prior to receiving a next packet.

Figure 5:
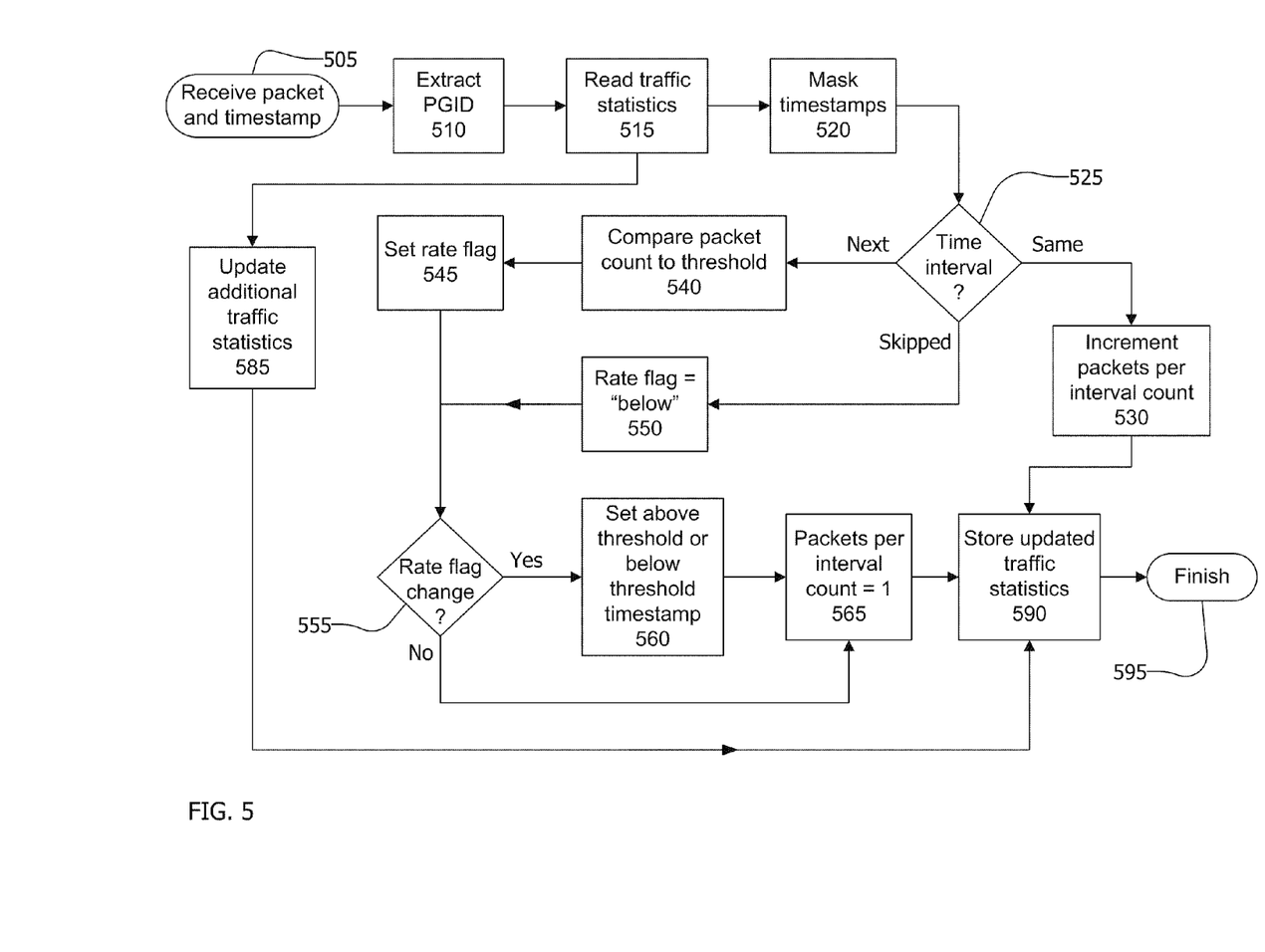
FIG. 5 is flow chart for the operation of a statistics engine.

FIG. 5 is block diagram of logic within a statistics engine such as the statistics engine 260 or 460. Each block in FIG. 5 is defined by the function performed by the corresponding logic element. For ease of explanation, FIG. 5 may also be interpreted as a flow chart of a process performed by the statistics engine, with the understandings that the "steps" of the process may be performed essentially simultaneously and that the entire process may be performed within a single clock cycle.

The process may start at 505 when the statistics engine receives a packet with an associated receive timestamp. At 510, test data including a packet group identifier (PGID) may be extracted from the received packet, for example, by the test data extractor 462. The extracted packet group identifier may identify the packet as a member of a specific packet group.

Figure 6:
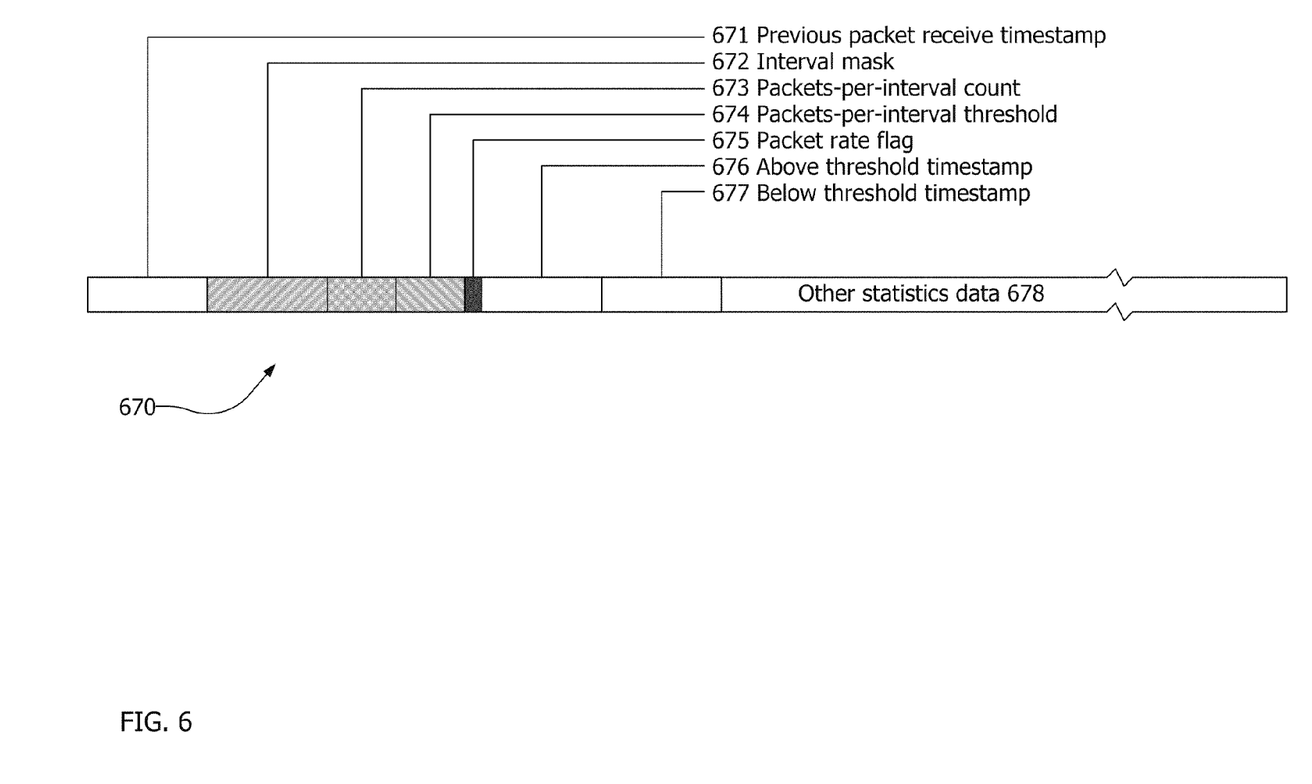
FIG. 6 is a graphical representation of statistics data.

At 515, traffic statistics associated with the specific packet group may be read from a statistics memory such as the statistics memory 465. The traffic statistics may be read at 515 using a read address based on the packet group identifier extracted at 510. Referring now to FIG. 6, the traffic statistics 670 read at 515 may include a previous packet receive timestamp 671 that defines a time when the previous packet belonging to the specific packet group was received. The traffic statistics 670 may also include a timestamp mask 672, a packets-per-interval count 673, and a packets-per-interval threshold 674. The traffic statistics 670 may also include a rate flag 675 indicating if a packet receive rate is above or below the packets-per-interval threshold. The traffic statistics 670 may also include an above threshold timestamp 676 indicating when the rate flag changed from below the threshold to equal to or greater than the threshold, and a below threshold timestamp indicating when the rate flag rate changed from equal to or greater than the threshold to below the threshold.

The traffic statistics 670 may include additional statistics 678 not associated with determining packet receive rate. Referring back to FIG. 5, additional traffic statistics not associated with determining packet receive rate may be updated at 585.

Still referring to FIG. 5, a packet receive rate may be determined by the actions from 520 to 565. At 520 the previous packet receive timestamp read at 515 (671 in FIG. 6) and the receive timestamp of the current packet may be masked using the timestamp mask (672 in FIG. 6) read at 515. The timestamp mask may determine which bits of both timestamps are ignored when the timestamp are subsequently compared.

Figure 7:
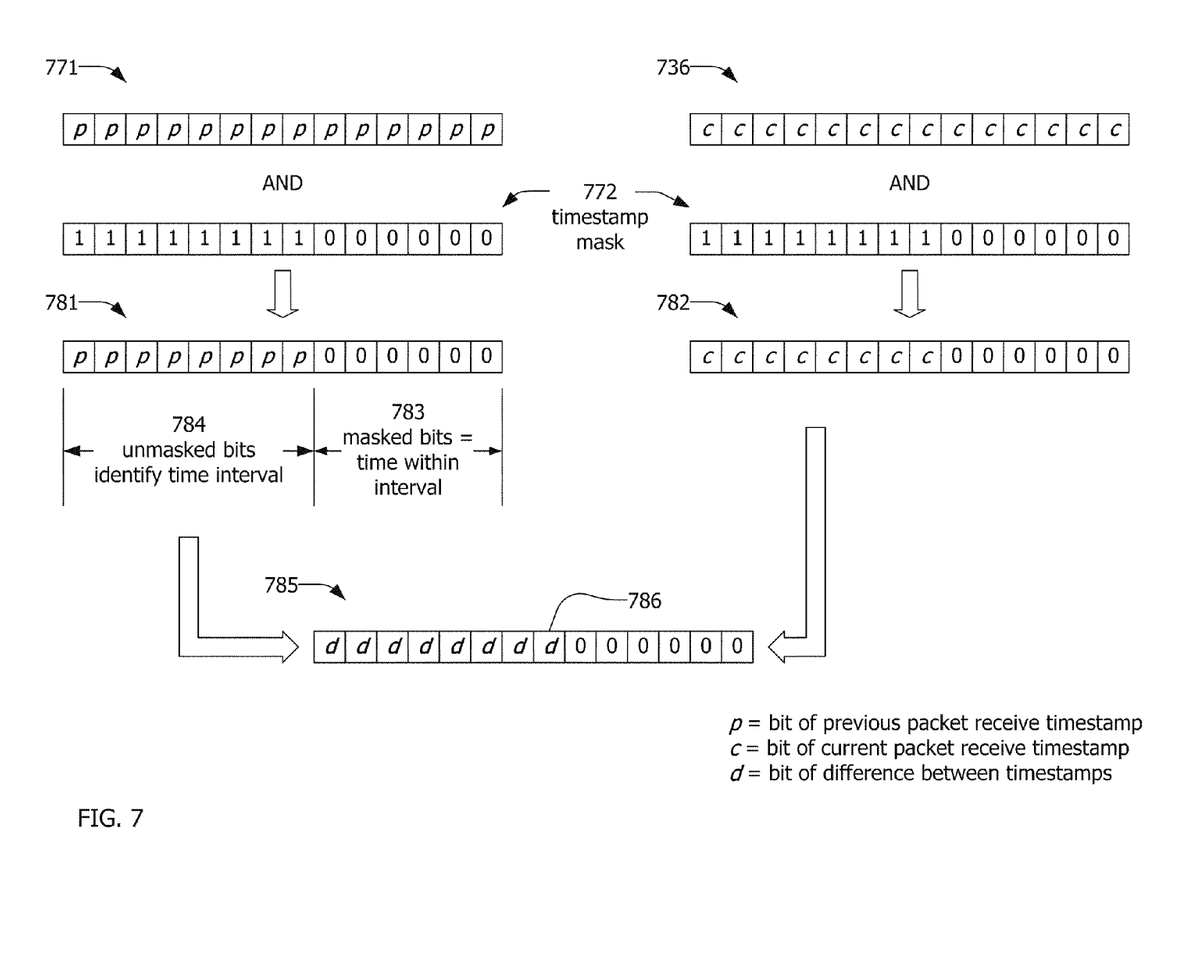
FIG. 7 is a graphical representation of comparing masked timestamps.

Referring to FIG. 7, a previous packet receive timestamp 771 may consist of a number of bits p representing the time, in clock cycles, when a previous packet in the packet group was received. Similarly, a current packet receive timestamp 730 may consist of the same number of bits c representing the time, in clock cycles, when the current packet was received. When the previous and current receive timestamps 771, 736 are compared, a predetermined number of bits may be ignored or have no effect on the comparison. In the example of FIG. 7, each of the previous and current timestamps 771, 736 may be masked by a timestamp mask 772 using an AND function such that one or more least significant bits 783 of each masked timestamp 781, 782 are set to zero. Since the least significant bits of both masked timestamps 781, 782 are forced to be equal, the least significant bits have no effect when the masked timestamps 781, 782 are compared. Alternatively, the "zero" and "one" values of the interval mask may be reversed and combined with the timestamps using an OR function such that the least significant bits of both masked timestamps 781, 782 are set to one.

The bits 783 masked by the timestamp mask may define the duration of a series of recurring time intervals. For example, if the four least significant bits of the timestamps are masked, the time interval duration will be 16 clock cycles; if eight least significant bits are masked, the time interval duration will be 256 clock cycles. The values (prior to being masked) of the least significant bits of the timestamps 771, 736 define the time that a packet arrived within a time interval. The unmasked bits 784 define in which time interval the packet was received.

The masked timestamps may be compared, for example, by subtracting the masked previous packet receive timestamp 781 from the masked current packet receive timestamp 782 to produce a difference value 785. When the previous packet and the current packet are received within the same time interval, the difference value 785 may be zero. When the previous packet and the current packet are received within successive time intervals, the masked previous packet receive timestamp 781 and the masked current packet receive timestamp 782 will differ by one count of a least significant unmasked bit 786, which is to say that the bits of the difference value 785 will be "zero" except for a "one" in the unmasked least significant bit 786. When the difference value has a "one" in any bit position other than the least significant unmasked bit 786, at least one time intervening interval may have elapsed (without receiving any packet belonging to the specific packet group) between the time interval when the previous packet was received and the current time interval.

Referring back to FIG. 5, the masked previous packet receive timestamp and the masked current packet receive timestamp from 520 may be compared at 525. One determination that may be made at 525 is that current packet arrived within the same time interval as the previous packet. Specifically, if the masked previous packet receive timestamp and the masked current packet receive timestamp are equal, a determination may be made at 525 that the current packet was received within the same time interval as the previous packet. In this case, the packets-per-interval count retrieved at 515 may be incremented, or increased by one, at 530 in acknowledgement of the receipt of the current packet.

If, at 525, the masked previous packet receive timestamp and the masked current packet receive timestamp differ by one count of the least significant unmasked bit, a determination may be made that the current packet was received in a next time interval, or the time interval immediately subsequent to the time interval when the previous packet was received. In this case, the previous time interval has ended, and the packets-per-interval count read at 515 represents the total number of packets received in the previous time interval. At 540 the packets-per-interval count read at 515 may be compared to a packet-per-interval threshold also read at 515. At 545 a rate flag (previously read at 515) may be set to a first logical value indicate that the packets-per-interval count is equal to or above the packet-per-interval threshold. At 545 the rate flag may be set to a second logical value to indicate that the packets-per-interval count is above the packet-per-interval threshold. Either "1" or "0" may be used to represent the first logical value.

If, at 525, the masked previous packet receive timestamp and the masked current packet receive timestamp differ by more than just the least significant unmasked bit, a determination may be made that the current packet was received in a new time interval and at least one intervening time interval was skipped without receiving any packets belonging to the specific packet group. In this case, the packets-per-interval count read at 515 does not represent the total number of packets received in the previous time interval, but rather a number of packets received in some earlier time interval. Since no packets were received at least one skipped time interval immediately preceding the current time interval, the rate flag may be set at 550 to the second logical value to indicate that the packets-per-interval count in the previous time interval was below the packets-per-interval threshold.

After the rate flag is set at 545 or 550, a determination may be made at 555 whether or not, in setting the rate flag, the value of the rate flag was changed from a previous value read at 515. When the rate flag was changed from the second logical value to the first logical value, an above threshold timestamp (676 in FIG. 6) may be set equal to the previous packet receive timestamp at 560. The above threshold timestamp may then identify the time interval when the packets-per-interval rate increased from below the packets-per-internal threshold to above or equal to the packets-per-interval threshold. When the rate flag was changed from the first logical value to the second logical value, a below threshold timestamp (677 in FIG. 6) may be set equal to the previous packet receive timestamp at 560. The below threshold timestamp may then identify the time interval when the packets-per-interval rate fell from above or equal to the packets-per-interval threshold to below the packets-per-internal threshold.

Whether or not the rate flag was changed at 545 or 550, the packet per time interval count may be reset to one at 565 to indicate that the current packet is the first packet in a new time interval.

At 590, the traffic statistics read at 515 and updated or modified at 530, 545, 550, 560, 565, and/or 585 may be stored in the statistics memory. The updated traffic statistics may be stored at 590 in the statistics memory at the same address used to read the traffic statistics at 515, such that updated traffic statistics may be stored in the statistics memory in place of the previously read traffic statistics. The reading of the traffic statistics at 515 and the storing of the traffic statistics at 590 may be accomplished in a single read-modify-write memory cycle.

Still referring to FIG. 5, a method for testing a network may include extracting a packet group identifier (PGID) from a packet received from the network at 510 and retrieving traffic statistics associated with the extracted PGID from a statistics memory at 515. The retrieved traffic statistics may include a packets-per-interval count and a predetermined packet-per-interval threshold, wherein the packets-per-interval count may indicate a number of packets having the extracted PGID received within a time interval of a sequence of time intervals of predetermined length.

At the start of each new time interval, a flag indicating whether or not the number of packets having the extracted PGID received in a previous time interval was equal to or greater than the packets-per-interval threshold may be set at 540-550. The flag may be stored in the statistics memory as part of the traffic statistics associated with the extracted PGID at 590.

The method for testing a network may also include, at 525, determining whether or not a new time interval has started based on the current receive timestamp associated with the packet received at 505 and a previous packet receive timestamp included in the traffic statistics retrieved at 515. The current receive timestamp and the previous packet receive timestamp may be masked by a timestamp mask included in the traffic statistics read at 515. The timestamp mask may define one or more least significant bits of the timestamps that may be ignored or to have no effect when the current receive timestamp and the previous packet receive timestamp are subsequently compared to determine whether or not a new time interval has started. The number of least significant bits masked by the timestamp mask may determine the length of the successive time intervals.

When, at 525, the masked current receive timestamp and the masked previous packet receive timestamp are determined to be equal, the packets-per-interval count read at 515 may be incremented at 530. At 590, the incremented packets-per-interval count may be stored in the statistics memory as part of the traffic statistics associated with the extracted PGID. The incremented packets-per-interval count may be stored in the statistics memory in place of the packets-per-interval count retrieved at 515. Additionally at 590, the current receive timestamp may be stored in the statistics memory in place of the previous packet receive timestamp read at 515.

When, at 525, a determination is made that the masked current receive timestamp and the masked previous packet receive timestamp are not equal, the flag may be set at 545 or 550 to a first logical value indicating that the number of packets having the extracted PGID received in the previous time interval was equal to or greater than the packets-per-interval threshold read at 515. Alternatively, the flag may be set at 545 or 550 to a second logical value indicating that the number of packets having the extracted PGID received in the previous time interval was less than the packets-per-interval threshold. The packets-per-interval count may be reset to one at 565 in recognition that the current packet is the first packet of a new time interval. The reset packets-per-interval count and the flag may be stored in the statistics memory as part of the traffic statistics associated with the extracted PGID at 590. The reset packets-per-interval count may be stored in the statistics memory in place of the packets-per-interval count retrieved at 515. Additionally at 590, the current receive timestamp may be stored in the statistics memory in place of the previous packet receive timestamp retrieved at 515.

The method for testing a network may also include, at 555, determining whether or not the logical value of the flag was changed at 545 or 550. When the flag was changed from the second logical value to the first logical value, the previous packet receive timestamp may be set as an above threshold timestamp to be stored in the statistics memory as part of the traffic statistics associated with the extracted PGID. The above threshold timestamp may indicate a time interval when a reception rate for packets having the extracted PGID was at least equal to the packets-per-interval threshold. When the flag was changed from the first logical value to the second logical value, the previous packet receive timestamp may be set as a below threshold timestamp to be stored in the statistics memory as part of the traffic statistics associated with the extracted PGID. The below threshold timestamp may indicate a time interval when the reception rate for packets having the extracted PGID fell below the packets-per-interval threshold. The above threshold timestamp or the below threshold timestamp may be stored in the statistics memory at 590.

One network or network device performance parameter that may be tested is convergence time. Convergence time may be defined as the time required for the network or network device under test to react to a change in routing of packet streams. Convergence time may measure the ability of the network under test to reconfigure itself in response to a failure of a path or equipment external to the network Referring now to FIG. 8, a method 800 for determining the convergence time of a network or network device may have a start at 805 and a finish at 895. The method 800 may begin by defining a test equipment topology at 810. Defining the test equipment topology at 810 may include determining how many port units will be involved in the test session and where each port unit will connect to the network. Defining the test equipment topology at 810 may also include defining what each port unit will emulate during the test session. Each port unit may emulate as little as a single IP address and as much as an entire network encompassing a large plurality of IP addresses. Additionally, defining the test equipment topology at 810 may include defining control packets that will advertise each port unit to routers, switches, and other devices within the network using one or more routing protocols such as Border Gateway Protocol, Exterior Gateway Protocol, Open Shortest Path First Protocol, Resource Reservation Protocol and other routing protocols.

Figure 8:
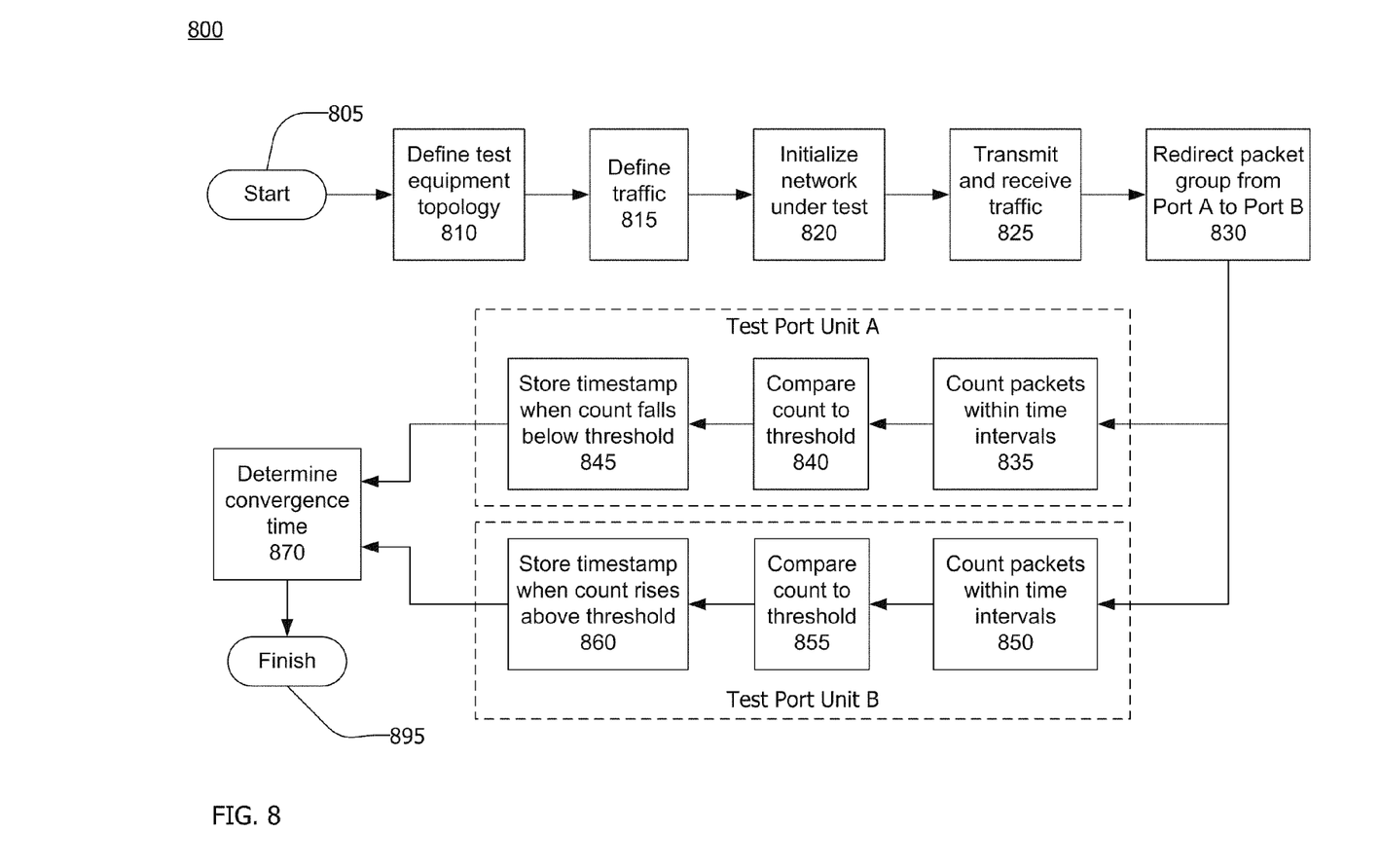
FIG. 8 is a flow chart of a process for measuring convergence.

At 815 the test traffic to be generated during the test session may be defined. The test traffic may be defined as a plurality of streams. Each stream may be described by stream data that defines attributes of the stream such as source port; transmission frequency; fixed and variables fields of the packets in the stream such as, for example, protocol or type of packet, source and destination IP addresses, type of service, and payload content; and other characteristics of each packet in the stream. An extensive test of a complex network may include thousands of streams comprising a million or more flows.

At 820, the network under test may be initialized to logically connect the IP addresses represented by the port units to the network under test. Initializing the network under test may include the port units advertising their presence to the network under test using one or more routing protocols such as Border Gateway Protocol, Exterior Gateway Protocol, Open Shortest Path First Protocol, Resource Reservation Protocol and other routing protocols. Initializing the network under test may also include the port units negotiating communications parameters, for example MPLS labels, with the network under test. Initializing the network under test may also include routers, switches, and other devices within the network under test populating routing tables and other information necessary for communications with the port units.

At 825, the test may begin with the port units transmitting and receiving test traffic, as defined at 815, via the network under test. The transmission of test traffic at 825 may continue until a stable flow of test traffic through the network under test is achieved.

At 830, after a stable flow of test traffic has been achieved, the test topology may be perturbed. Specifically, at 830, instructions may be sent to the network under test to redirect at least one flow including at least one packet group from a first port, which is coupled to Port Unit A, to a different second port, which is coupled to Port Unit B. The instructions to redirect the packet flow may be sent to the network under test by means of, for example, a routing protocol.

The convergence time of the network under test may depend on the complexity of the internal changes required to redirect the packet flow from the first port to the second port. Redirecting a packet flow from one port to another port of a switch unit may be accomplished by reconfiguring a routing table within the switch unit. Redirecting a packet flow from a port on a first router to a port on a second router physically separate from the first router may require reconfiguring routing tables at multiple network devices in addition to the first and second routers, and may require renegotiating MPLS labels and other communications parameters between multiple network units. While all of the internal reconfiguration is being accomplished, a plurality of packets belonging to the redirected packet groups may be propagating through the network under test. Whether these packets arrive at Port Unit A or Port Unit B may depend, in part, on where each packet was within the network under test when the test topology was reconfigured. Typically, the rate of packets arriving at Port Unit A may gradually decrease, and the rate of packets arriving at Port Unit B may gradually increase.

Port Unit A and Port Unit B may measure a packet rate for each packet group as described in conjunction with FIG. 5, FIG. 6, and FIG. 7. Specifically, at 835, Port Unit A may count, for each PGID, a number of packets that arrive within each time interval of a sequence of time intervals. At 840, at the start of each new time interval, Port Unit A may determine whether or not the packets-per-interval count for the previous time interval was less than a packets-per-interval threshold. When the packets-per-interval count falls below the packets-per-interval threshold, Port Unit A may save a below threshold timestamp at 845.

Similarly, at 850, Port Unit B may count, for each PGID, a number of packets that arrive within each time interval of the sequence of time intervals. At 855, at the start of each new time interval, Port Unit B may determine whether or not the packets-per-interval count for the previous time interval was equal to or greater than a packets-per-interval threshold. When the packets-per-interval count increases to at least the packets-per-interval threshold, Port Unit B may save an above threshold timestamp at 860.

For example, consider a situation where one selected packet group is redirected from Port Unit A to Port Unit B at 830. Prior to the redirection, Port Unit A is the intended destination for the selected packet group and the packets-per-interval count may be consistently above the packets-per-interval threshold for each time interval. In this case, the below threshold timestamp for the selected packet group at Port Unit A may have a default value of, for example, zero. Prior to the redirection, Port Unit B is not an intended destination for the selected packet group and the packets-per-interval count may be consistently zero for each time interval. In this case, the above threshold timestamp for the selected packet group at Port Unit B may have a default value of, for example, zero.

After the selected packet group is redirected from Port Unit A to Port Unit B, the number of packets belonging to the selected packet group arriving at Port Unit A may decrease and the number of packets belonging to the selected packet group arriving at Port Unit B may increase. At some time interval after the redirection, the packets-per-interval count for the selected packet group at Port Unit A will fall below the packet-per-interval threshold and a below threshold timestamp may be stored at 845. At a later time interval, the packets-per-interval count for the selected packet group at Port Unit B will become equal to or greater than the packet-per-interval threshold and an above threshold timestamp may be stored at 860.

At 870, a convergence time may be determined based on the below threshold timestamp stored at 845 and the above threshold timestamp stored at 860. Specifically, the time difference between the below threshold timestamp and the above threshold timestamp may be defined to be the convergence time of the network under test. For example, if an anticipated arrival rate for packets belonging to the select packet group is 100 packets per time interval, the threshold may be set at 90% of the anticipated rate or 90 packets per interval. In this example, the convergence time may be measured as the time interval from when less that 90% of the packets arrive at Port Unit A to when more than 90% of the packets arrive at Port Unit B.

The above threshold timestamp and the below threshold timestamp may be stored at the end of respective time intervals, such that the time difference between the above threshold timestamp and the below threshold timestamp will be an integer multiple of the time interval duration. Thus the resolution of a convergence time measurement may be determined by the selection of the time interval.

When a relatively uniform reception rate is anticipated, a short time interval may be selected to improve the resolution of the convergence time measurement. The threshold may then be set in consideration of the number of packets anticipated during the selected time interval.

However, if the packet reception rate at Port Unit B is anticipated to be inconsistent, a relatively long time interval may be selected to avoid inaccurate convergence time measurements due to bursts of packets. For example, if a short time interval and corresponding low threshold are selected, an anomalous burst of packets in one time interval may trigger an inappropriate "above threshold" determination at 860. In this situation, incorrect convergence time measurements may be avoided by setting the time interval long enough to capture several bursts of packets and setting the threshold to a value substantially higher than the number of packets expected in a single burst. However, the resolution of the resulting convergence time measurement may be limited by the longer time interval.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

What is claimed is:

1. An apparatus for testing a network, comprising:
a statistics engine coupled to a statistics memory, the statistics engine configured:
to extract a packet group identifier (PGID) from a packet received from the network
to retrieve traffic statistics associated with the extracted PGID from the statistics memory, the retrieved traffic statistics including a packets-per-interval count and a predetermined packets-per-interval threshold, the packets-per-interval count indicating a number of packets having the extracted PGID received within a time interval of a sequence of time intervals of predetermined length
at the start of each new time interval, to set a flag indicating whether or not the number of packets having the extracted PGID received in a previous time interval was equal to or greater than the packets-per-interval threshold, wherein the flag is stored in the statistics memory as part of the traffic statistics associated with the extracted PGID.

2. The apparatus of claim 1, further comprising:
a timestamp generator to associate a current receive timestamp with each received packet
wherein the statistics engine is further configured to determine whether or not a new time interval has started based on the current receive timestamp and a previous packet receive timestamp included in the retrieved traffic statistics.

3. The apparatus of claim 2, wherein the statistic engine is further configured:
to mask the current receive timestamp and the previous packet receive timestamp using a timestamp mask included in the retrieved traffic statistics, the timestamp mask defining one or more least significant bits to be ignored
to compare the masked current receive timestamp and the masked previous packet receive timestamp to determine whether or not a new time interval has started.

4. The apparatus of claim 3, wherein the number of least significant bits masked by the timestamp mask determines the length of the successive time intervals.

5. The apparatus of claim 3, wherein
when the masked current receive timestamp and the masked previous packet receive timestamp are equal, the statistics engine
increments the packets-per-interval count
stores the incremented packets-per-interval count in the statistics memory in place of the retrieved packets-per-interval count
stores the current receive timestamp in the statistic memory in place of the retrieved previous receive timestamp.

6. The apparatus of claim 3, wherein
when the masked current receive timestamp and the masked previous packet receive timestamp are not equal, the statistics engine
sets the flag to a first logical value indicating that the number of packets having the extracted PGID received in the previous time interval was equal to or greater than the packets-per-interval threshold or to a second logical value indicating that the number of packets having the extracted PGID received in the previous time interval was less than the packets-per-interval threshold
resets the packets-per-interval count to one
stores the reset packets-per-interval count in the statistics memory in place of the retrieved packets-per-interval count
stores the current receive timestamp in the statistic memory in place of the retrieved previous receive timestamp.

7. The apparatus of claim 6, wherein
when the statistics engine changes the flag from the second logical value to the first logical value, the statistics engine stores the previous packet receive timestamp as an above threshold timestamp included in the traffic statistics associated with the extracted PGID, the above threshold timestamp indicating a time interval when a reception rate for packets having the extracted PGID was at least equal to the packets-per-interval threshold.

8. The apparatus of claim 7, wherein
when the statistics engine changes the flag from the first logical value to the second logical value, the statistics engine stores the previous packet receive timestamp as a below threshold timestamp included in the traffic statistics associated with the extracted PGID, the below threshold timestamp indicating a time interval when the reception rate for packets having the extracted PGID fell below the packets-per-interval threshold.

9. A machine readable storage medium containing configuration data which, when used to program a field programmable gate array, causes the field programmable gate to include a statistics engine configured to:
extract a packet group identifier (PGID) from a packet received from the network
retrieve traffic statistics associated with the extracted PGID from a statistics memory, the retrieved traffic statistics including a packets-per-interval count and a predetermined packets-per-interval threshold, the packets-per-interval count indicating a number of packets having the extracted PGID received within a time interval of a sequence of time intervals of predetermined length
at the start of each new time interval, set a flag indicating whether or not the number of packets having the extracted PGID received in a previous time interval was equal to or greater than the packets-per-interval threshold, wherein the flag is saved in the statistics memory as part of the traffic statistics associated with the extracted PGID.

10. The machine readable storage medium of claim 9, the statistics engine further configured to:
determine whether or not a new time interval has started based on a current receive timestamp associated with the received packet and a previous packet receive timestamp included in the retrieved traffic statistics.

11. The machine readable storage medium of claim 10, the statistic engine further configured to:
mask the current receive timestamp and the previous packet receive timestamp using a timestamp mask included in the retrieved traffic statistics, the timestamp mask defining one or more least significant bits to be ignored
compare the masked current receive timestamp and the masked previous packet receive timestamp to determine whether or not a new time interval has started.

12. The machine readable storage medium of claim 11, wherein the number of least significant bits masked by the timestamp mask determines the length of the successive time intervals.

13. The machine readable storage medium of claim 12, wherein, when the masked current receive timestamp and the masked previous packet receive timestamp are equal, the statistics engine
increments the packets-per-interval count
stores the incremented packets-per-interval count in the statistics memory in place of the retrieved packets-per-interval count
stores the current receive timestamp in the statistic memory in place of the retrieved previous receive timestamp associated.

14. The machine readable storage medium of claim 13, wherein, when the masked current receive timestamp and the masked previous packet receive timestamp are not equal, the statistics engine
sets the flag to a first logical value indicating that the number of packets having the extracted PGID received in the previous time interval was equal to or greater than the packets-per-interval threshold or to a second logical value indicating that the number of packets having the extracted PGID received in the previous time interval was less than the packets-per-interval threshold
resets the packets-per-interval count to one
stores the reset packets-per-interval count in the statistics memory in place of the retrieved packets-per-interval count
stores the current receive timestamp in the statistic memory in place of the retrieved previous receive timestamp.

15. The machine readable storage medium of claim 14, wherein, when the statistics engine changes the flag from the second logical value to the first logical value, the statistics engine stores the previous packet receive timestamp as an above threshold timestamp included in the traffic statistics associated with the extracted PGID, the above threshold timestamp indicating a time interval when a reception rate for packets having the extracted PGID was at least equal to the packets-per-interval threshold.

16. The machine readable storage medium of claim 14, wherein, when the statistics engine changes the flag from the first logical value to the second logical value, the statistics engine stores the previous packet receive timestamp as a below threshold timestamp included in the traffic statistics associated with the extracted PGID, the below threshold timestamp indicating a time interval when the reception rate for packets having the extracted PGID fell below the packets-per-interval threshold.

17. A method for testing a network, comprising:
extracting a packet group identifier (PGID) from a packet received from the network
retrieving traffic statistics associated with the extracted PGID from a statistics memory, the retrieved traffic statistics including a packets-per-interval count and a predetermined packet-per-interval threshold, the packets-per-interval count indicating a number of packets having the extracted PGID received within a time interval of a sequence of time intervals of predetermined length
at the start of each new time interval, setting a flag indicating whether or not the number of packets having the extracted PGID received in a previous time interval was equal to or greater than the packets-per-interval threshold and storing the flag in the statistics memory as part of the traffic statistics associated with the extracted PGID.

18. The method of claim 17, further comprising:
associating a current receive timestamp with each received packet
determining whether or not a new time interval has started based on the current receive timestamp and a previous packet receive timestamp included in the retrieved traffic statistics.

19. The method of claim 18, further comprising:
masking the current receive timestamp and the previous packet receive timestamp using a timestamp mask included in the retrieved traffic statistics, the timestamp mask defining one or more least significant bits to be ignored
comparing the masked current receive timestamp and the masked previous packet receive timestamp to determine whether or not a new time interval has started.

20. The method of claim 19, wherein the number of least significant bits masked by the timestamp mask determines the length of the successive time intervals.

21. The method of claim 19, further comprising:
when the masked current receive timestamp and the masked previous packet receive timestamp are equal
incrementing the packets-per-interval count
storing the incremented packets-per-interval count in the statistics memory in place of the retrieved packets-per-interval count
storing the current receive timestamp in the statistic memory in place of the retrieved previous receive timestamp.

22. The method of claim 19, further comprising:
when the masked current receive timestamp and the masked previous packet receive timestamp are not equal
setting the flag to a first logical value indicating that the number of packets having the extracted PGID received in the previous time interval was equal to or greater than the packets-per-interval threshold or to a second logical value indicating that the number of packets having the extracted PGID received in the previous time interval was less than the packets-per-interval threshold
resetting the packets-per-interval count to one
storing the reset packets-per-interval count in the statistics memory in place of the retrieved packets-per-interval count
storing the current receive timestamp in the statistic memory in place of the retrieved previous receive timestamp.

23. The method of claim 22, wherein
when the flag is changed from the second logical value to the first logical value, storing the previous packet receive timestamp as an above threshold timestamp included in the traffic statistics associated with the extracted PGID, the above threshold timestamp indicating a time interval when a reception rate for packets having the extracted PGID was at least equal to the packets-per-interval threshold.

24. The method of claim 22, wherein
when the flag is changed from the first logical value to the second logical value, storing the previous packet receive timestamp as a below threshold timestamp included in the traffic statistics associated with the extracted PGID, the below threshold timestamp indicating a time interval when the reception rate for packets having the extracted PGID fell below the packets-per-interval threshold.

* * * * *